(12) United States Patent
Nazzer

(10) Patent No.: US 11,802,452 B2
(45) Date of Patent: Oct. 31, 2023

(54) METHOD FOR SEPARATING DRILL FLUID FROM OILY DRILL CUTTINGS SLURRIES

(71) Applicant: Craig Nazzer, New Plymouth (NZ)

(72) Inventor: Craig Nazzer, New Plymouth (NZ)

( * ) Notice: Subject to any disclaimer, the term of this patent is extended or adjusted under 35 U.S.C. 154(b) by 0 days.

(21) Appl. No.: 17/964,036

(22) Filed: Oct. 12, 2022

(65) Prior Publication Data
US 2023/0032931 A1 Feb. 2, 2023

Related U.S. Application Data

(62) Division of application No. 16/756,393, filed as application No. PCT/NZ2018/050152 on Oct. 30, 2018, now abandoned.

(30) Foreign Application Priority Data

Oct. 30, 2017 (NZ) ........................................ 736823

(51) Int. Cl.
*B01D 15/00* (2006.01)
*E21B 21/06* (2006.01)

(52) U.S. Cl.
CPC ............ *E21B 21/068* (2013.01); *B01D 15/00* (2013.01); *E21B 21/066* (2013.01)

(58) Field of Classification Search
CPC ...... B01D 15/00; E21B 21/066; E21B 21/068
See application file for complete search history.

(56) References Cited

U.S. PATENT DOCUMENTS

| 5,156,686 A | 10/1992 | Van Slyke |
| 6,218,342 B1 * | 4/2001 | Patel ........................ C09K 8/52 507/239 |
| 6,593,279 B2 * | 7/2003 | Von Krosigk ......... C09K 8/524 507/261 |
| 8,415,279 B2 | 4/2013 | Quintero et al. |
| 8,871,695 B2 | 10/2014 | Quintero et al. |
| 2008/0169103 A1 * | 7/2008 | Carbajal ................... C09K 8/52 166/300 |
| 2008/0277165 A1 | 11/2008 | Nahmad |
| 2013/0269735 A1 | 10/2013 | Roetzel et al. |
| 2014/0305875 A1 * | 10/2014 | Larson .................. E21B 21/065 210/695 |
| 2015/0315454 A1 | 11/2015 | Perez-Cordova |
| 2016/0107105 A1 | 4/2016 | Simpson |
| 2016/0326020 A1 * | 11/2016 | Kubala ..................... C02F 1/72 |

FOREIGN PATENT DOCUMENTS

WO WO2018182433 A2 10/2018

* cited by examiner

*Primary Examiner* — Alicia Bland
(74) *Attorney, Agent, or Firm* — Todd Martin

(57) ABSTRACT

The present invention provides a method for separating oily drill fluid from an oily drill cuttings slurry comprising oily drill fluid and drill cuttings. The method comprises destructively modifying at least a portion of the drill cuttings that are contacted by at least one cuttings-reactive chemical thereby disrupting attraction forces between the portion of the drill cuttings and the oily drill fluid and making it easier for mechanical cuttings treatment equipment to separate oily drill fluid from the oily drill cuttings slurry.

4 Claims, No Drawings

METHOD FOR SEPARATING DRILL FLUID FROM OILY DRILL CUTTINGS SLURRIES

TECHNICAL FIELD

This invention relates generally to a method for enabling or improving the separation of oily liquids from cuttings slurries produced during drilling of wells.

BACKGROUND

Wells (e.g. for oil and gas production, geothermal energy etc.) are typically drilled through subsurface rock (e.g. sandstone) using drilling rigs fitted with a rotatable drill string assembly at the end of which is attached a rotary drill bit. The rotating drill bit breaks the rock into fragments, known as "cuttings", which are continuously flushed out of the well. The flushing is done by injecting drilling "mud" that contains drill fluid into the well. The mud flows down to the rotating drill bit and back up to the well head, typically through the annular space between the rotating drill string and the well bore. This circulating flow of drilling mud carries the cuttings in a slurry to the surface, as well as providing lubrication and cooling to the rotating drill string assembly.

Many different formulations of drilling mud can be used, which are typically divided into three categories, namely Water Based Mud (WBM), Oil Based Mud (OBM) and Synthetic Based Mud (SBM). The liquid phases of OBM and SBM are substantially comprised of oil or oil-like liquids, typically mixed with other added substances to improve performance, which are referred to in this specification as "oily drill fluid". It is also to be understood that the special category of invert emulsion drilling muds (i.e. water-in-oil emulsions) are deemed to be variants of either OBM or SBM. There are performance differences, advantages and disadvantages with each type of drilling mud and selection depends upon many variable factors relating to the well, drilling system used and type of rock being drilled.

A common challenging problem with wells drilled using OBM and SBM, and types of WBM that contain a significant quantity of oily drill fluid, is the handling, storage, treatment, and transport of the oily cuttings slurry that flows up and out of the well. The oily drill fluid components in the cuttings slurry frequently include valuable base oils and chemicals that had been constituents of the original mud that had been injected into the well. Hence it is generally desirable to treat the cuttings slurry in ways that recover the oily drill fluid for re-use. Some components of oily drill fluids may also be harmful to the environment, hence the recovery of as much oily drill fluid as possible results in cleaner cuttings that can be disposed of without breaching environmental regulations.

Many countries have banned dumping of inadequately treated oily cuttings. A limit of 1% "oil-on-cuttings" (OOC) has been widely applied and is markedly more stringent than the older limit of 6.9%. In addition to complying with the OOC limit any solution must also keep pace with the rate at which cuttings are produced during well drilling so as to avoid overwhelming the drilling rig with cuttings. There are typically 3 options, namely: disposal of untreated or partially treated cuttings down a disposal well; treat the cuttings on-site; transport cuttings to another site for treatment e.g. "skip and ship" cuttings from offshore to onshore.

On-site treatment typically entails use of mechanical liquid-solid separation systems that include tanks, mixers, conveyors, shale shakers, hydrocyclones, centrifuges, vertical cuttings dryers and the like that achieve a degree of bulk separation of oily drill fluid from cuttings solids but are frequently unable to meet oil-on-cuttings targets. Consequentially, some drilling operators apply thermal methods that require significant investment in equipment and high energy to vaporize the oily drill fluid. Yet the alternatives to on-site treatment (when there is no suitable disposal well), such as skip and ship from offshore to onshore, are themselves often expensive, labour intensive and potentially hazardous.

As an alternative to mechanical cuttings treatment numerous chemical separation methods have been developed to decontaminate drill cuttings and other difficult to separate mixtures of oily liquids and solid matter (e.g. oil contaminated sands and tailings ponds associated with oil sands, tar sands, and heavy oil deposits). These chemical separation methods include dissolving the oily liquid in organic solvents, mixing the oily cuttings with surfactants mixing the oily cuttings with an oil soluble carboxylic acid, binding the oily components in a polymer, mixing with ionic liquids or deep eutectic solvents to extract the oily components, treating with micro-emulsion cleaning solution containing a variety of chemicals including surfactants and solvents.

A common feature of these chemical separation methods such as those cited above is the emphasis placed on cleaning or decontaminating the drill cuttings by using added substances that modify the behaviour of the drill fluid. These added substances can form solutions with the oily drill fluid that may in many cases cause undesirable changes to the properties of the drill fluid. This may have been less of a concern when drill fluids were simple liquids (e.g. diesel) but that is changing as enhancements in drilling technology have raised the complexity and value of drill fluids. This in turn means that significant further treatments can be necessary to remove the added substances from the recovered drill fluid, which adds costs and complexity.

An alternative path has been to apply newly developed chemicals such as ionic liquids and deep eutectic solvents that have minimal effect on the drill fluid. Some of these methods have the potential to avoid damaging the recovered drill fluids. Nevertheless this is a relatively new field of research involving exotic or unusual substances that are not otherwise commonly used in oil and gas operations. Other disadvantages may also arise such as limited applicability over the range of rock types and wells that are drilled worldwide, cost, hazards, restricted availability, or other obstacles to widespread use.

Other recent advances using liquid carbon dioxide or supercritical liquids do not involve exotic substances but they typically require operation at high pressures which adds to cost and complexity.

Many of these chemical separation methods in the prior art are proposed in isolation or as replacements for current mechanical cuttings treatment methods which include operation of equipment such as shale shakers, centrifuges, hydrocyclones, cuttings driers and the like. These types of equipment have evolved over many decades to become effective in achieving at least modest success in separating drill fluids from oily cuttings slurries over a wide range of rock types and well drilling circumstances. Many oil and gas well drillers may be reluctant to abandon reliable and well understood current mechanical methods.

Until now there has been a shortage of chemical solutions that minimise adverse effects on the recovered drill fluid, and that apply chemicals in common use in the oil and gas industry, and that can be readily implemented in conjunction with or integrated into current mechanical cuttings treatment systems.

Thus there is a need for new methods for treatment of oily drill cuttings. In particular there is a need for cost effective methods, such as the present method, to improve recovery of drill fluids from oily drill cuttings slurries in ways that:
- attack worthless drill cuttings in preference to damaging the valuable drill fluids
- make use of the effective equipment and systems in use at well drilling sites
- apply chemicals, processes and techniques that are familiar to and within the competence and skills of well drilling crews.

It is an object of the present invention to overcome some of the abovementioned difficulties, or to at least provide the public with a useful alternative.

SUMMARY

There is provided non-limiting embodiments of a method for separating oily drill fluid from an oily drill cuttings slurry comprising oily drill fluid and drill cuttings. In said embodiments at least one cuttings-reactive chemical contacts and reacts with at least a portion of the drill cuttings thereby causing the destructive modification of at least a portion of the drill cuttings which in turn disrupts attraction forces between oily drill fluid and at least a portion of the drill cuttings. The disruption of said attraction forces makes it easier to separate oily drill fluid from drill cuttings using conventional cuttings treatment technology.

In this Summary the meanings of terms as used herein are the same as the meanings of said terms that are explained and defined in the Description part of this patent application.

In one non-limiting embodiment there is provided a method for separating oily drill fluid from an oily drill cuttings slurry, the method comprising mixing at least one liquid additive solution comprising:
- at least one cuttings-reactive chemical with at least a portion of the oily drill cuttings slurry thereby creating a chemically treated cuttings slurry wherein at least one cuttings-reactive chemical contacts and reacts with at least a portion of the drill cuttings; and
- destructively modifying at least a portion of the drill cuttings that are contacted by at least one cuttings-reactive chemical thereby disrupting attraction forces between the portion of the drill cuttings and the oily drill fluid.

In a second non-limiting embodiment there is provided a method for separating oily drill fluid from an oily drill cuttings slurry, the method comprising mixing at least one liquid additive solution comprising:
- at least one cuttings-reactive chemical with at least a portion of the oily drill cuttings slurry thereby creating a chemically treated cuttings slurry wherein at least one cuttings-reactive chemical contacts and reacts with at least a portion of the drill cuttings; and
- destructively modifying at least a portion of the drill cuttings that are contacted by at least one cuttings-reactive chemical thereby disrupting attraction forces between the portion of the drill cuttings and the oily drill fluid; and
- moving at least a portion of the chemically treated cuttings slurry into mechanical cuttings treatment equipment (MCTE) selected from the group consisting of: a settling tank, a mixing tank, a heating tank, an oven, a conveyor, a sieve, a screen, a filter, a vibrator, a shaker, a shale shaker, a cuttings dryer, a centrifuge, a hydrocyclone and combinations thereof, wherein the MCTE separates at least a portion of the oily drill fluid from at least a portion of the chemically treated cuttings slurry; and
- removing at least a portion of the separated oily drill fluid from the MCTE.

In a third non-limiting embodiment there is provided a method for separating oily drill fluid from an oily drill cuttings slurry, the method comprising:
- placing the oily drill cuttings slurry into mechanical cuttings treatment equipment (MCTE) selected from the group consisting of: a settling tank, a mixing tank, a heating tank, an oven, a conveyor, a sieve, a screen, a filter, a vibrator, a shaker, a shale shaker, a cuttings dryer, a centrifuge, a hydrocyclone, and combinations thereof, and operating said MCTE to produce at least one mechanically treated cuttings slurry comprising oily drill fluid and drill cuttings; and
- mixing at least one liquid additive solution comprising at least one cuttings-reactive chemical with at least a portion of the at least one mechanically treated cuttings slurry thereby creating a chemically treated cuttings slurry wherein at least one cuttings-reactive chemical contacts and reacts with at least a portion of the drill cuttings; and
- destructively modifying at least, a portion of the drill cuttings that are contacted by at least one cuttings-reactive chemical thereby disrupting attraction forces between the portion of the drill cuttings and the oily drill fluid; and
- moving at least a portion of the chemically treated cuttings slurry into MCTE wherein the MCTE separates at least a portion of the oily drill fluid from at least a portion of the chemically treated cuttings slurry; and
- removing at least a portion of the separated oily drill fluid from the MCTE.

In a fourth non-limiting embodiment there is provided a method for separating oily drill fluid and barite from an oily drill cuttings slurry comprising oily drill fluid and drill cuttings and barite, the method comprising:
- placing the oily drill cuttings slurry into mechanical cuttings treatment equipment (MCTE) selected from the group consisting of: a settling tank, a mixing tank, a heating tank, an oven, a conveyor, a sieve, a screen, a filter, a vibrator, a shaker, a shale shaker, a cuttings dryer, a centrifuge, a hydrocyclone, and combinations thereof, and operating said MCTE to produce at least one mechanically treated cuttings slurry comprising oily drill fluid and drill cuttings and barite; and
- mixing at least one liquid additive solution comprising at least one cuttings-reactive chemical with at least a portion of the at least one mechanically treated cuttings slurry thereby creating a chemically treated cuttings slurry wherein at least one cuttings-reactive chemical contacts and reacts with at least a portion of the drill cuttings; and
- destructively modifying at least a portion of the drill cuttings that are contacted by at least one cuttings-reactive chemical thereby disrupting attraction forces between the portion of the drill cuttings and the oily drill fluid and creating a barite-enhanced cuttings slurry in which the solids weight percent of barite has increased; and
- moving at least a portion of the barite-enhanced cuttings slurry into MCTE wherein the MCTE separates at least a portion of the oily drill fluid and barite from at least a portion of the barite-enhanced cuttings slurry; and removing at least a portion of the separated oily drill fluid and barite from the MCTE.

In another non-limiting embodiment, the drill cuttings comprise between 10 and 99 wt % silicate minerals.

In another non-limiting embodiment, the drill cuttings comprise between 25 and 80 wt % silicate minerals, In another non-limiting embodiment, the drill cuttings comprise between 40 and 70 wt % silicate minerals.

In another non-limiting embodiment, the at least one cuttings-reactive chemical comprises hydrogen fluoride, hydrogen chloride, hydrogen bromide and combinations thereof.

In another non-limiting embodiment, the at least one cuttings-reactive chemical comprises one or more chemical substances selected from the group consisting of ammonium fluoride, ammonium bifluoride, barium fluoride, calcium fluoride, sodium fluoride, potassium fluoride, potassium bifluoride, fluoroboric acid, fluorosulfuric acid, antimony pentafluoride, hydrochloric acid, hydrofluoric acid, hexafluorosilicic acid, phosphoric acid, hydrobromic acid, phosphonic acid, sulfuric acid, nitric acid, citric acid, carboxylic acid, a chelation agent and combinations thereof.

In another non-limiting embodiment, the at least one cuttings-reactive chemical comprises one or more chemical substances selected from the group consisting of hydrogen fluoride, hydrogen chloride, hydrogen bromide. ammonium fluoride, ammonium bifluoride, carboxylic acid, a chelation agent and combinations thereof.

In another non-limiting embodiment the chelation agent comprises one or more chemical substances selected from the group consisting of NN hydroxyethyliminodiacetate (HEIDA) diethylenetriaminepentacetic acid, (DPTA), ethylenediaminetetraacetic acid (EDTA), nitrilotriacetic acid (NTA), L-glutamic acid-NN-diacetic acid (GLDA), hydroxy ethylethylenediaminetetraacetic acid (HEDTA) and combinations thereof.

In another non-limiting embodiment, the at least one liquid additive solution comprises a liquid selected from the group consisting of water, methanol, ethanol, a glycol, and combinations thereof.

In another non-limiting embodiment the method further comprises mixing at least one first reactant with a liquid solution comprising at least one second reactant selected from the group consisting of sulfuric acid, hydrochloric acid, phosphoric acid, nitric acid, phosphonic acid, carboxylic acid, and combinations thereof thereby creating the at least one cuttings-reactive chemical.

In another non-limiting embodiment the at least one first reactant in the embodiment to create the at least one cuttings-reactive chemical comprises one or more chemical substances selected from the group consisting of sodium fluoride, sodium bifluoride, calcium fluoride, aluminium fluoride, ammonium fluoride, ammonium bifluoride, ammonium borofluoride, barium fluoride, potassium fluoride, potassium bifluoride, sodium monofluorophosphate, apatite, cryolite and combinations thereof.

In another non-limiting embodiment the at least one first reactant in the embodiment to create the at least one cuttings-reactive chemical comprises ammonium fluoride or sodium fluoride or calcium fluoride or barium fluoride or combinations thereof.

In another non-limiting embodiment the method further comprises mixing at least one first reactant that comprises barium fluoride with a liquid solution comprising at least one second reactant that comprises sulfuric acid, thereby creating, upon mixing said first and second reactants, barite and at least one cuttings-reactive chemical.

In another non-limiting embodiment, the method further comprises recovering from drill cuttings slurry at least a portion of the barite that is created in the embodiment to create barite.

In another non-limiting embodiment the at least one cuttings-reactive chemical comprises sodium hydroxide or potassium hydroxide or sodium carbonate or potassium carbonate or sodium bicarbonate or combinations thereof.

DESCRIPTION

The treatment of slurries to separate and recover valuable or harmful liquids can at times be particularly challenging, such as when recovering oily drill fluid from oily drill cuttings slurries. In many such cases industry specific solid-liquid separation systems have been used or proposed that include cuttings treatment methods that attempt to break the attraction or adhesive forces between oily liquids and solid particles. Many oily drill cuttings treatment systems in use or that have been proposed include mechanical equipment and/or exposing the oily cuttings to added chemicals.

It is to be appreciated that the term cuttings slurry used in this specification means any mixture comprising solid matter in the form of rock particles (including aggregations of rock particles if present) that are created by the rotating drill bit breaking up subsurface rock during well drilling operations and are herein termed "drill cuttings" and any liquid. Said mixture can have any degree of wetness ranging from about 5 wt % liquid and 95 wt % solid matter (i.e. damp solid matter and not technically a "slurry" in the common definition of the term) to 99 wt % liquid and 1 wt % solid matter (also not what most people would consider to be a slurry). The term "slurry" is adapted for use in this specification and encompasses the above defined broad range for the possible wetness of mixtures of cuttings and liquid that can be considered for treatment by the present method. The cuttings slurry may be in an untreated 'as is' condition from the well that is being drilled, or may have been at least partially treated, or may be in the process of being simultaneously treated, by any one or more cuttings treatment methods.

In this specification the term "oily drill cuttings slurry" means a type of cuttings slurry in which the liquid comprises oily drill fluid and the solid matter comprises inorganic drill cuttings.

The range of mechanical equipment, herein termed "mechanical cuttings treatment equipment" (MCTE) used in cuttings treatment systems that separate liquid and solid constituents of oily cuttings slurries includes any one or more of:

Tanks and vessels, including settling tanks, separators, mud tanks, mixing tanks and the like Heaters including microwave heating systems Mixers and stirrers Shale shakers that perform initial separation of oily drill cuttings slurry into a "shaker overflow" stream comprising most of the larger oil-coated rock fragments that do not fall through the shaker screens, and a "shaker underflow" stream comprising the solids and liquids that fall through the shaker screens Centrifuges or hydrocyclones that split cuttings slurries (typically the shaker underflow) into a number of streams, including a "fines" stream that typically comprises a mixture of fine particles and a large fraction of the drill fluid, and a "heavies" stream that comprises the remaining liquid and solid matter Barite centrifuge that spins cuttings slurries to extract a heavies stream containing a significant fraction of the barite added as weighting agent to the drill fluid Cuttings dryers that apply centrifugal action to treat cuttings slurries that have been partially treated by other equipment (e.g. shaker overflow)

Hammermills and other types of thermal desorption equipment

Filters, sieves and screens

Vibrators including ultrasonic vibration systems

Auxiliary systems, hardware and software that are needed to operate the above listed equipment The treatment of OBM (oil based mud) and SBM (synthetic based mud) oily drill cuttings slurries typically has two main objectives; firstly to recover valuable OBM and SBM drill fluid that can be reused, and secondly to produce waste solid matter that has minimal oil-on-cuttings contamination to enable disposal without harming people or the environment. A typical oily drill cuttings slurry also contains barite or other similar mud weighting additive which is a valuable substance and worth recovering for reuse, which can be done to a modest degree by operating types of MCTE that are suited to recover barite (e.g. barite recovery centrifuge).

The oily drill cuttings slurry typically flows from the well that is being drilled to one or more tanks and from there to one or more shale shakers. The shale shaker overflow typically contains half or more of the total weight of the drill cuttings but these cuttings also typically comprise a significant fraction of the oily drill fluid which can be due to the adhesive and/or attraction forces between the oily drill fluid and the drill cuttings. The shaker overflow is often shipped to other sites for further treatment and disposal which adds to costs and loss of drill fluid.

The shale shaker underflow typically flows to a centrifuge that applies centrifugal forces to "spin out" a significant portion of the larger/heavier cuttings particles, typically including barite, into a "heavies" stream in which the solid matter is coated with oily drill fluid. Most of the oily drill fluid and smaller/lighter cuttings particles tend to accumulate in a "fines" stream in the form of a thorough mix of fine cuttings particles and oily drill fluid, i.e. the drill fluid remains contaminated by fine particles.

As oil and gas production technology has evolved over many decades there have been significant advances that have enabled longer and more challenging wells to be drilled faster and more efficiently. OBM and SBM drill fluids have evolved to become more complex and precise in their chemical composition, with a corresponding increase in their cost of supply to well drilling operations if they are not recycled. This creates an increasing need to treat OBM and SBM drill cuttings in ways that recover as much drill fluid as possible while minimizing undesirable changes to the properties of the recovered drill fluid.

The MCTE at well sites frequently cannot recover the maximum possible amount of drill fluid and/or reduce the oil-on-cuttings to target levels, especially when the "rate of progress" (ROP) of the drilling assembly is high. This can be partly due to adhesion of the oily substances in the drill fluid to the solid matter in the oily drill cuttings slurries. As a consequence the cuttings slurries may have to be transported at considerable cost to another site where more extensive treatment options are available.

In oily drill cuttings slurries there can be strong attraction forces that tend to bind drill fluid to the surfaces of the rock particles and that can also contribute to formation of aggregations of oil coated rock particles. These attraction forces typically cannot be adequately overcome by the MCTE alone. In the present specification and the claims the meaning of the phrase "attraction forces between at least a portion of the drill cuttings and oily drill fluid" as used herein encompasses all the forces and other factors that can cause the oily drill fluid to stick to, or cling to, or bind to, or resist separation from, the drill cuttings. Said forces and other factors include but are not necessarily limited to intermolecular forces and/or material surface properties (e.g. oleophilic or hydrophobic) and/or surface tension differences and/or electrical charges and/or other contributing phenomena.

A person skilled in the art will know that the mineral composition of the rock particles in cuttings slurries can vary widely around the world depending on the type of rock that the rotating drill string is penetrating. Most such rock types are primarily comprised of carbonate minerals (e.g. limestone) or silicate minerals (e.g. sandstone). Some troublesome particles are in micro-platelet form such as aluminosilicate clays. The full range of minerals that can be encountered includes essentially all minerals that exist in the upper portion of the earth's crust, both onshore and below the seabed. Rocks of different mineral compositions can react to particular chemicals in different ways and to varying degrees, or not at all. For example carbonates dissolve readily in hydrochloric acid while many silicate minerals (e.g. sandstone and many types of clay) can be attacked and dissolved by hydrofluoric acid.

The fundamental concept applied in the present method is to apply chemicals, herein termed "cuttings-reactive chemicals" that comprise chemical substances that chemically attack and thereby "destructively modify" at least a portion of the drill cuttings in the oily drill cuttings slurry being treated. The meaning of the term "destructively modify" as used herein includes dissolve (including etch) and/or break up and/or decompose. The drill cuttings being attacked comprise rock particles and/or aggregations of rock particles. The rock particles comprise carbonates (e.g. limestone) and/or silicates (e.g. sandstone and various types of clay) and/or other rock that may be penetrated by the well drilling equipment. This is done by bringing one or more cuttings-reactive chemicals into contact with the rock particles. At least some of the solid matter in the drill cuttings is consequently destructively modified (i.e. dissolved and/or broken up, and/or decomposed). Because of this destructive modification at least some of the attraction forces between drill cuttings and oily drill fluid are consequently disrupted. The meaning of the term "disrupted" as used herein regarding the attraction forces between cuttings particles and drill fluid includes reduced, broken, nullified or extinguished. The oily drill cuttings slurry that has been treated in this manner is herein termed "chemically treated cuttings slurry".

There are numerous reactions that can take place between the cuttings-reactive chemical(s) and the drill cuttings, noting the complex chemistry of the minerals, especially clays and other silicates, that the drill cuttings are made of, the net effect being the disruption of attraction forces between drill fluid and drill cuttings. One non-limiting, simplistic way to view this is that a significant portion of the cuttings have been destructively modified leaving less intact unmodified solid matter for the drill fluid to adhere to. The oily drill fluid in the chemically treated cuttings slurry can then separate more easily from the drill cuttings. This is novel and markedly different from the many alternative chemical cuttings treatment methods described in the prior art that do not deliberately attack the solid matter but instead use mostly organic substances that typically dissolve or modify, or carry a significant risk of modifying, the composition and/or characteristics and/or behaviour of the oily drill fluid.

In a typical cuttings treatment system a centrifuge is used to spin-out the heavier cuttings particles form the shale shaker underflow. The underflow from this centrifuge usually comprises drill fluid that is contaminated by very small cuttings particles. In many conventional cuttings treatment systems there is nothing more that can be done and operators accept the poor quality of the recovered drill fluid. The fines-contaminated drill fluid is typically then added to fresh drill fluid so as to dilute the contamination and remixed with the drilling mud system inventory. Over time this increases the overall level of fines contamination in the mud system, eventually to an unacceptable degree. In applications where such contamination by fine particles is a problem it is envisaged that the present method may be applied to destructively modify (e.g. dissolve), and thereby essentially destroy at least some of the very fine particles that are too small to be separated using a centrifuge, thereby improving the quality of recovered drill fluid.

Typically the cuttings-reactive chemicals are components of at least one liquid solution, herein termed "liquid additive solution", that is mixed with the oily drill cuttings slurry being treated. To be clear the term "cuttings-reactive chemical" as used herein encompasses the molecules of the cuttings-reactive chemical as well as the dissociated ions that may exist when said cuttings-reactive chemical is dissolved in liquid additive solution. For example hydrogen fluoride is the name given to a cuttings-reactive chemical that encompasses hydrogen fluoride in molecular form as well as the related dissociated ions that may form when hydrogen fluoride is dissolved in liquid additive solution, including hydrogen ion, fluoride ion, bifluoride ion, and/or hydronium fluoride ion. Typically at least some of these ions may participate in reactions that cause the destructive modification of drill cuttings.

In many cases the liquid in the liquid additive solution may be water however the Applicant has determined that the inclusion of an alcohol in the liquid additive solution can in some cases offer significant advantages when attacking the rock particles. For this reason the present method includes a non-limiting embodiment wherein the liquid additive solution comprises a liquid selected from the group consisting of: water, methanol, ethanol, a glycol such as ethylene glycol, and combinations thereof.

The intent of the present method is not to replace the use of MCTE but to enable such equipment to achieve better results, such as higher capacity, lower oil-on-cuttings, better barite recovery, higher percentage recovery of oily drill fluid etc. In non-limiting embodiments the chemically treated cuttings slurry is fed to MCTE to separate and recover oily drill fluid (and barite in some cases), which can now be done to a higher standard of performance due to the disruption of the attraction forces between drill cuttings and oily drill fluid caused by the reactions between cuttings-reactive chemicals and drill cuttings.

The present method thereby provides a means of enhancing the performance of cuttings treatment systems. A cuttings treatment system that includes MCTE is anticipated to be operated in a coordinated manner with the present method to achieve a higher recovery of the higher valued components of the oily drill cuttings slurry, namely oily drill fluid (plus barite in some cases) and lower oil-on-cuttings level on waste solid matter than would have been possible without the present method. Even a small improvement in cuttings treatment system performance is expected to be helpful. Consider cases where the drilling technology has advanced to enable longer wells to be drilled faster, i.e. at higher ROP thereby increasing the flow rate of oily cuttings that must be treated. The present method gives the well drilling operator an option of applying the novel chemical treatment described herein as an alternative to spending large sums of capital to upgrade the MCTE to match the faster well drilling capability. Even if there are obstacles to continuous use of the present method the well drilling operator may still gain a significant advantage by just using it on an as-needed basis during peak ROP periods.

A further mode of application of the present method is to use it to recover all but a small fraction of the recoverable drill fluid and to then apply a volatile organic solvent washing of a small residue of oily drill fluid from the drill cuttings so as to reach an oil-on-cuttings level that enables simple low cost cuttings disposal.

The present method was conceived as a result of experimental investigations carried out by the Applicant to find potential cuttings-reactive chemicals that could attack rock cuttings in oily drill cuttings slurries while avoiding if possible dissolution or dilution or unacceptable adverse changes to the properties of the oily drill fluid. Some of the chemicals that were observed to be effective during the experiments, such as aqueous hydrogen halide solutions especially hydrogen chloride and/or hydrogen fluoride, turn out to be similar to the chemicals used by oil and gas producers worldwide to stimulate increased hydrocarbon production from existing oil and gas wells using the well-known acidizing technique. When a gas or oil well is acidized, "mud acid", a mixture of hydrochloric and hydrofluoric acid, is injected into the well. The mud acid is pushed into the rock in the hydrocarbon reservoir, which it then destructively reacts with, thereby opening up flow paths for hydrocarbons to flow through to and up the well. Scientific reports of studies of acidizing chemistry carried out over several decades contain many descriptions of how acidizing chemicals destructively react with carbonate and silicate minerals including (but not necessarily limited to): dissolution of carbonate by hydrochloric acid attack; dissolution of sandstone and clay by mud acid attack; strong acid attack that removes iron, magnesium and aluminium from clay and breaks up its structure; chelation of metal ions in rock minerals; dissolution of carbonate minerals by carboxylic acid (e.g. formic acid, acetic acid); dissolution of carbonate minerals by chelating agents; dissolution of silicate due to adsorption of hydrogen fluoride molecules; adsorption of hydrogen ions into the surface structure of the silicate rock followed by decomposition of the silicate lattice framework; rupture of the chains of silica molecules leading to break up of silicate rock structure; rock dissolution due to acid attack by hydrogen ions and hydronium ions; dissolution and/or decomposition of the silicate surface structure due to attack by fluoride and bifluoride ions; and dissolution of silica in alkaline solutions (e.g. sodium hydroxide). The nature of the rock and the type of acidizing chemical used have an effect as to which one or more of these reactions take place. The Applicant has determined that similar destructive reactions can occur when contacting cuttings-reactive chemicals with drill cuttings, thereby disrupting the attraction forces between oily drill fluid and drill cuttings. To be clear the term "destructively modify" as used herein encompasses the above list of potential reactions that cause at least a portion of the drill cuttings to be dissolved, broken-up or decomposed.

Establishing that there is some common ground with acidizing operations is a remarkable and helpful development given that the conditions downhole some thousands of metres below ground in wells that have been operating for some time are markedly different from the conditions on the surface where the oily cuttings are being treated. This suggests that liquid additive solutions comprising hydrogen chloride and/or hydrogen fluoride have the potential to work effectively as cuttings—reactive chemicals to enhance the performance of MCTE used to recover drill fluid from oily drill cuttings slurries over a wide range of mineral types and operating conditions.

Another important benefit is that firms in the oil and gas industry are typically already familiar with, and have facilities, experienced personnel and procedures suited to, the handling, storage, and use of acidizing chemicals. This suggests that the use of chemicals that are similar to acidizing chemicals, as proposed in the present method, may be a relatively low cost and manageable add-on to current well drilling operations. In contrast many of the alternative chemical cuttings treatment concepts described in the prior art involve complex or exotic recipes or chemistry or implementation procedures.

An expert in the field will also recognise that similar solids destructive reactions also take place when using reactive fluoride compounds for etching silica during semiconductor manufacturing and when preparing mineral samples for laboratory analyses (e.g. for ICP-MS). This provides further potentially helpful overlap with expertise in other industries in the application of chemicals that are similar to the cuttings-reactive chemicals proposed in the present method.

To be clear none of the methods relating to acidizing of oil and gas wells or semi-conductor manufacturing or sample preparation for laboratory analyses suggest or disclose the use of cuttings-reactive chemicals to cause destructive reactions with drill cuttings and thereby improve the recovery of valuable oily drill fluids from oily drill cuttings slurries while also helping to achieve low levels of oil-on-cuttings to facilitate low cost waste cuttings disposal without harming people or the environment.

In the present specification and claims there are essential steps that include mixing at least one liquid additive solution comprising at least one cuttings-reactive chemical with oily drill cuttings slurry. To be clear the term "mixing" as used herein in the description of said essential steps includes the understanding that said mixing is done in any practicable manner that causes at least one cuttings-reactive chemical to contact and react with at least a portion of the drill cuttings in the oily drill cuttings slurry so as to consequently cause the destructive modification of at least a portion of said drill cuttings. The most direct, but not necessarily preferred, way to do this is to mix pre-prepared cuttings-reactive chemicals into the oily drill cuttings slurry. In non-limiting embodiments, the cuttings-reactive chemicals comprise chemical substances selected from the group consisting of ammonium fluoride, ammonium bifluoride, barium fluoride, calcium fluoride, sodium fluoride, potassium fluoride, potassium bifluoride, fluoroboric acid, fluorosulfuric acid, antimony pentafluoride, hydrochloric acid, hydrofluoric acid, hexafluorosilicic acid, phosphoric acid, hydrobromic acid, phosphonic acid, sulfuric acid, nitric acid, citric acid, carboxylic acid, a chelation agent and combinations thereof. In another non-limiting embodiment the cuttings-reactive chemicals comprise chemical substances selected from a group consisting of hydrogen fluoride, hydrogen chloride, hydrogen bromide, ammonium fluoride, ammonium bifluoride, carboxylic acid, a chelation agent and combinations thereof. In another non-limiting embodiment the chelation agent in the embodiments in which a chelating agent is present in the liquid additive solution, comprises one or more chemical substances selected from the group consisting of NN hydroxyethyliminodiacetate (HEIDA) diethylenetriaminepentacetic acid, (DPTA), ethylenediaminetetraacetic acid (EDTA), nitrilotriacetic acid (NTA), L-glutamic acid-NN-diacetic acid (GLDA), hydroxy ethylethylenediaminetetraacetic acid (HEDTA) and combinations thereof.

The Applicant has determined that alkali substances (e.g. sodium hydroxide and potassium hydroxide) can destructively modify silicate minerals. Although sodium and potassium hydroxide can react with and modify many fats and oils (e.g. saponification) there may be applications in which the quality of the oily drill fluid being recovered by the present method is not excessively adversely affected by contact with sodium or potassium hydroxide, or the quantity of drill fluid that is adversely affected is tolerable. Under these circumstances the present method may be practiced with the use of sodium hydroxide, potassium hydroxide or other alkali substances as a cuttings-reactive chemical. The present method includes a non-limiting embodiment wherein at least one cuttings-reactive chemical comprises sodium hydroxide or potassium hydroxide or sodium carbonate or potassium carbonate or sodium bicarbonate or combinations thereof.

Because of the wide range of minerals that can be found in drill cuttings at well sites around the world, plus the range of drill fluid compositions, there may be wide variations in the ideal choice of cuttings-reactive chemicals to employ for each application. In some applications a single cuttings-reactive chemical may be the optimum choice. In other applications it may be better to use combinations of chemicals. The use of combinations of chemicals is also a typical approach followed in the oil and gas industry when acidizing wells. It is also to be understood that in applications where combinations of the listed chemicals are used as the cuttings-reactive chemicals the individual chemicals of said combinations do not all have to be particularly effective on their own, provided that the combination of chemicals that they are a part of works. It is to be further understood that in the present method the individual chemicals in said combinations may, in some applications, be mixed with oily drill cuttings slurry sequentially via several liquid additive solutions that are separately mixed one after the other with the oily drill cuttings slurry, while in other applications it may be best to mix together the individual chemicals in said combinations in one liquid additive solution. Again there is an analogy with some acidizing techniques whereby a number of acidizing chemicals are introduced one after the other into the well being treated.

The direct use of some of these chemicals, such as hydrofluoric acid (i.e. an aqueous solution of hydrogen fluoride), might not be preferred because handling these chemicals can introduce health and safety risks to personnel. In non-limiting embodiments an alternative approach that can reduce health and safety concerns in many cases is to create cuttings-reactive chemicals by mixing together reactant chemicals that are less hazardous on their own. These reactant chemicals, herein termed "reactants", react with each other in a liquid solution to create the one or more desired cuttings-reactive chemicals. In a further embodiment the reactants can also be mixed with the oily drill cuttings slurry, either one after the other or simultaneously. The cuttings-reactive chemicals are thereby created in situ in a liquid additive solution that is in direct contact with the components of the oily drill cuttings slurry. These cuttings-reactive chemicals created by this method may then promptly begin to contact and react with drill cuttings. As the cuttings-reactive chemicals participate in destructive reactions with the drill cuttings they become "spent" and, in many cases, less hazardous, while at least a portion of the drill cuttings that they have contacted are destructively modified.

For example hydrogen fluoride is a particularly potent but also hazardous cuttings-reactive chemical. It can be made by mixing a less hazardous first reactant with a less hazardous second reactant. In one non-limiting embodiment the first reactant comprises at least one fluoride-containing compound selected from the group consisting of sodium fluoride, sodium bifluoride, calcium fluoride, aluminium fluoride, ammonium fluoride, ammonium bifluoride, ammonium borofluoride, barium fluoride, potassium fluoride, potassium bifluoride, sodium monofluorophosphate, apatite, cryolite and combinations thereof. In another non-limiting embodiment the first reactant comprises ammonium fluoride or sodium fluoride or calcium fluoride or barium fluoride or combinations thereof. The first reactant is mixed with a liquid solution comprising at least one second reactant selected from the group consisting of sulfuric acid, hydrochloric acid, phosphoric acid, nitric acid, phosphonic acid, carboxylic acid, and combinations thereof thereby creating at least one cuttings-reactive chemical (e.g. hydrogen fluoride). In one non-limiting embodiment the mixing of the first and second reactants may be done in-situ in a mixing tank that also contains the oily drill cuttings slurry. This causes a reaction within the mixture of liquids and oily drill cuttings slurry in the mixing tank thereby creating a liquid additive solution in contact with drill cuttings and in which hydrogen fluoride is dissolved. The hydrogen fluoride and/or its related dissociated ions in the liquid additive solution can then begin to react with and destructively modify drill cuttings. This embodiment avoids the need for separate hydrogen fluoride storage and handling, thereby reducing the risk of personnel exposure to hazards.

To be clear the labels "first" and "second" in reference to the reactants described above do not in any way define the order in which such chemicals might be mixed with oily drill cuttings slurry. For example in some applications the best outcome may occur if a second reactant e.g. hydrochloric acid, is first mixed with oily drill cuttings slurry, followed by a first reactant e.g. ammonium fluoride, while in other applications it may be better to start with the first reactant and later add in the second reactant, or it may be best to mix the first and second reactants into the oily drill cuttings slurry at the same time.

In the Applicant's experiments there was no observed advantage in forming an emulsion of various added chemicals. Simple solutions containing non-emulsified cuttings-reactive chemicals were effective on their own. Given that not all cuttings treatment systems perform well when emulsions are present it is envisaged that the best results may be obtained if emulsions are minimised or avoided in the chemically treated cuttings slurry so as to not impair the performance of the MCTE. Thus, in non-limiting embodiments, the method may be practiced in the absence of an emulsion. In the experiments emulsions sometimes formed as a result of the reactions between aqueous solutions of cuttings-reactive chemicals and drill cuttings. In some applications it is expected that the present method may be practised with the addition of demulsifier to reduce the detrimental effect of emulsions, if any have formed in the chemically treated cuttings slurry.

In most of the Applicant's experiments cuttings-reactive chemicals were used without adding surfactants, oil-soluble solvents, or emulsifier. In other words, in non-limiting embodiments, the method described herein may be practiced in the absence of a surfactant, in the absence of an emulsifier, and in the absence of an oil-soluble solvent. In many of the Applicant's experiments the rock minerals in the oily cuttings slurries were effectively attacked with simple inorganic chemicals in an aqueous solution that contained dissolved hydrogen fluoride, and/or reactants that when combined cause the creation of hydrogen fluoride, and/or hydrogen chloride. Hydrogen fluoride and hydrogen chloride are highly soluble in water which is typically no more than slightly soluble in oily drill fluid. This lack of a requirement for organic substances that are significantly soluble in oily drill fluid is an important feature of the present method that is expected to reduce the risk of causing excessive unwanted changes to the composition or properties of the recovered oily drill fluid. In one non-limiting embodiment the present method may be practiced in the absence of organic substances in the liquid additive solution that are more than sparingly soluble in the oily drill fluid. However in some applications the method may still be practiced with the use of substances that readily dissolve in the drill fluid if such substances do not significantly impair the performance of the method and the dissolution in the drill fluid does not degrade the quality of the recovered drill fluid to an unacceptable degree.

To be clear there is a wide range of potential applications of the present method, covering numerous rock types and well drilling circumstances. These include not just oil and gas wells but also geothermal wells and other wells drilled for purposes other than oil and gas production. In some of these applications the performance of the method may be improved if additional chemicals, say surfactants, are used. Or there may be applications in which it is acceptable or desirable to include substances (for example carboxylic acid or chelation agent) that may enhance the performance of the method while also being soluble in the particular drill fluid being recovered. Or emulsions may at times be desirable, while at most other times measures may be warranted to avoid emulsions possibly by introducing demulsifiers. It is envisaged that in some applications other chemicals such as surfactant or demulsifier may optionally be added before, at the same time as, or after the one or more cuttings-reactive chemicals are mixed with oily drill cuttings slurry. However there is no requirement in the present method for such added chemicals to be mixed with cuttings-reactive chemicals into a single solution that is then mixed with the oily drill cuttings slurry. Nevertheless, an important step is that at least one cuttings-reactive chemical reacts with and destructively modifies at least a portion of the drill cuttings, which in turn disrupts at least some of the attraction forces between at least some drill cuttings and oily drill fluid thereby enabling MCTE to achieve better separation of drill fluid from oily drill cuttings slurry.

Barite Recovery and Make-Up

The Applicant has further determined that some cuttings-reactive chemicals (e.g. aqueous hydrogen fluoride solution) do not dissolve barite or do so only at a rate that is slow enough to be inconsequential. In well-known oil and gas industry reference documents (e.g. Petrowiki online chapter on acidizing) barite is referred to as insoluble in many liquids including acetic acid, hydrochloric acid, hydrofluoric acid, aromatic solvent and EDTA.

Barite is a valuable high density mineral that is intentionally added as a weighting agent to drilling mud. Well drilling operators typically operate MCTE such as centrifuges to recover barite from oily drill cuttings slurries. Furthermore there are reports that in some jurisdictions (e.g. offshore Norway) environmental concerns are being raised about heavy metals discovered in drilling waste sediments that contain barite. Concerns have also been expressed about the cost and availability of future supplies of barite. These concerns can be expected to increase the incentives to improve barite recovery from well drilling operations.

The present method also provides a means of improving the performance of barite recovery equipment by use of cuttings-reactive chemicals that dissolve or otherwise destructively modify worthless rock cuttings particles while leaving the barite particles relatively intact. This produces a "barite enhanced cuttings slurry" in which the "solids weight percent of barite" has increased. The term "solids weight percent of barite" as used herein means the weight of barite particles as a percentage of the weight of the total population of particles (i.e. barite plus drill cuttings) in the cuttings slurry being treated. The weight of drill cuttings decreases due to destructive modification hence the percentage of barite increases. In at least some of these applications the average size of at least some of the drill cuttings may also decrease and accentuate the size plus density difference compared to the barite particles. These are beneficial effects that can be expected to increase the effective capacity and/or barite selectivity of the MCTE used to recover barite.

Furthermore it may be possible in some applications to replace at least some of the barite that may be unavoidably lost with waste cuttings by applying another embodiment of the present method, namely to select barium fluoride and sulfuric acid as two of the reactants that are mixed to create cuttings-reactive chemicals. When the barium fluoride is mixed with sulfuric acid to create hydrogen fluoride (a cuttings-reactive chemical), barium sulfate, which is barite, is also created. This barite then precipitates due to its low solubility after which it may be recoverable using conventional technology because its density (about 4.2 to 4.5 g/ml) is significantly higher than the density of most rock cuttings (typically 2.6-2.7 g·ml). The use of the present method, with the barium fluoride-sulfuric acid reaction included, may help to maintain barite levels and reduce the need to supply barite to the well drilling site.

Experiments

The Applicant conducted experiments on samples of oily drill cuttings slurries from a New Zealand well drilled in 2016 in which the oily drill fluid is mainly composed of SARALINE 185 (available from Shell Chemical). The cuttings treatment system included MCTE comprising tanks, shale shaker, and centrifuge that treated the shale shaker underflow. Well site samples were collected in 5 litre pails from each of the three main output streams, namely the shale shaker overflow, centrifuge heavies and centrifuge fines. The sample pails were left undisturbed for over a year before the experiments were done, hence the samples were well aged. It has been reported that aged oily drill cuttings slurries are harder to treat than freshly made cuttings slurries.

The rock cuttings particles in the shaker overflow sample were individually visible as small bead size fragments coated in oily drill fluid. The rock particles in the centrifuge heavies sample were much smaller and stuck together with oily drill fluid in large firm aggregated lumps.

The centrifuge fines sample comprised very small rock particles in a homogeneous mixture with drill fluid in a soft gel-like non-flowing mass in which the liquid content is estimated to be about 85 vol %. The semi-solid form of the centrifuge fines sample illustrates some of the challenges when treating oily drill cuttings slurries. Other slurries composed of 85 vol % oily liquid and fine rock particles would typically resemble a soup that behaves like a thickened liquid at worst. The non-flowing nature of the centrifuge fines sample suggested to the Applicant that the attraction forces that cause oily drill fluid and rock cuttings particles to cling to each other and resist separation by conventional means are particularly strong. The centrifuge fines have a high value because they are predominantly comprised of valuable drill fluid. Despite this high value they are typically diluted with fresh drill fluid and simply mixed back into the drilling mud system due to the lack of treatment options. This eventually leads to unacceptably high fines contamination of the circulating mud inventory.

The rock in the NZ samples is primarily composed of silicate and carbonate minerals which is consistent with published geological information that describe the subsurface rock as calcareous sandstone, greywacke, limestone and clays. Clay particles are on average smaller than other rock particles and typically tend to accumulate in the centrifuge fines stream. Barium in the form of barite used as a weighting agent is also present in the NZ samples especially in the centrifuge heavies as expected.

In preliminary testing SARALINE 185 was thoroughly stirred into beakers containing aqueous liquid additive solutions of hydrogen chloride, hydrogen fluoride, sodium fluoride and ammonium fluoride respectively. The liquid additive solutions comprised a range of liquids including water alone and solutions of water and alcohol, including methanol, ethanol and ethylene glycol. The mixtures were left to settle by gravity. In all cases the SARALINE 185 separated and there was no readily discernible change to either the SARALINE 185 or the aqueous solutions.

In experiment herein named HW1 subsamples from each of the three main samples were mixed with added SARALINE 185 to form a mixture that was intended to resemble the composition of the well head unprocessed oily drill cuttings slurry. This mixture was then submerged in hot (98 C) water and thoroughly stirred.

Almost all of the hot water became absorbed into the oily slurry with little apparent separation of liquids despite the fact that the SARALINE 185 is not miscible with water and has significantly lower density than water.

In experiment HW2 a 50 g sample consisting of lumps of centrifuge heavies was immersed in hot water and stirred. No beneficial results were observed. No oily liquid layer formed. The lumps remained intact and could not be readily broken up by stirring.

In experiment HW3 a 50 g sample of centrifuge fines was immersed in hot water and stirred. Most of the hot water was absorbed into the oily mass of fines which became somewhat less gel-like but there were no signs of separation of oily liquid or solid matter.

The results of experiments HW1 to HW3 are largely consistent with general knowledge and experience in the oil and gas industry that hot water alone is typically not effective in separating oily drill fluid from oily drill cuttings slurries.

In experiment CH1 lumps of centrifuge heavies were placed in a beaker and immersed in an aqueous hydrogen chloride solution (i.e. hydrochloric acid). The liquid turned green suggesting that the acid had dissolved some of the metals in the cuttings. Slow bubbling also commenced. An aqueous ammonium fluoride solution was then added, which prompted a vigorous reaction. The lumps fell apart with little or no agitation. When the reaction ceased and the sample was left to stand the liquids separated into a dark top layer and a greenish middle layer while solid matter collected in a lower light grey sediment. The break-up of the aggregated lumps of particles, the liquid-liquid separation and the sedimentation suggest that the attraction forces between the oily liquid (i.e. the SARALINE 185) and the drill cuttings had been significantly disrupted.

The centrifuge heavies contain a high fraction of barite, which is typical when drilling wells using barite as a mud weighting additive. In many applications the present method is expected to increase the solids weight percent of barite due to selective destructive modification of non-barite solids by cuttings-reactive chemicals. The results of experiment CH1 support this premise as the percent barite content in the treated centrifuge heavies was found by XRF analysis to be more than 25% higher than that in the untreated centrifuge heavies.

In experiment SS1 a 60 g sample of shaker overflow was immersed in an aqueous dilute hydrogen fluoride solution, which prompted a bubbling reaction. After the reaction ceased the cuttings were then drained and washed with water after which the oil-on-cuttings level was measured and found to have dropped to 3.3 wt %. These observations are consistent with the premise that hydrogen fluoride solution had reacted with the cuttings and caused a significant disruption of the attraction forces between the oily drill fluid and the cuttings. The cuttings were then washed in a light volatile hydrocarbon solvent (in this case petroleum ether) after which the oil-on-cuttings level had dropped to 0.5 wt %

In experiments CF1 to CF8 samples of centrifuge fines, each about 30-45 g, were treated with cuttings-reactive chemicals mixed with aqueous alcohol solutions (methanol, ethanol, ethylene glycol). In each experiment the cuttings-reactive chemicals were created within the samples by mixing either ammonium fluoride or sodium fluoride with hydrochloric acid in-situ, thereby creating a solution containing hydrogen fluoride and hydrogen chloride distributed throughout the centrifuge fines samples. Alcohol (i.e. methanol, ethanol or glycol) was stirred in before and after this step. The gel-like structure of the centrifuge fines that had hitherto failed to respond to conventional treatment methods broke-up easily with minimal agitation. Foaming, swelling, bubbling and heat evolution was observed suggesting that chemical reactions were occurring between the rock minerals and the hydrogen halide solutions. When the samples were left to stand they quickly settled by gravity into a dark upper layer, a clear middle layer and a thick bottom sediment layer.

A supportive aspect of the results of the above described experiments is that simple gravity settling in beakers was sufficient to promote the separation of at least some of the components of the oily drill cuttings slurry samples after treatment. This supports the premise that the chemical treatment used in the present method can, in many applications, be expected to significantly improve the performance of MCTE, noting that MCTE typically apply gravitational forces (e.g. settling), gravity plus vibration (e.g. shale shaker), and/or greatly amplified gravity-like forces (e.g. centrifuge) to separate drill fluid from cuttings.

In the above described experiments no surfactants or emulsifiers or coagulants or flocculants were used. This supports the premise that the present method can, in many applications, be expected to perform without use of such chemicals.

It is to be understood that the method is not limited to the exact details of oily drill fluid, oily drill cuttings slurries, drill cuttings, cuttings-reactive chemicals, attraction forces, mechanical cuttings treatment equipment, liquid additive solutions, first reactants, second reactants, neutralizing chemicals, volatile solvents, conditions, proportions, amounts, etc. shown and described, as modifications and equivalents will be apparent to one skilled in the art. The method is therefore to be limited only by the scope of the appended claims. Further, the specification is to be regarded in an illustrative rather than a restrictive sense. For example, specific combinations of components, proportions, conditions, dosages, amounts and the like falling within the described parameters herein, but not specifically identified or tried in a particular method or apparatus, are anticipated to be within the scope of this invention.

The present method may suitably comprise, consist or consist essentially of the elements disclosed and may be practiced in the absence of an element not disclosed. For instance, there may be provided a method for separating oily drill fluid from an oily drill cuttings slurry comprising oily drill fluid and drill cuttings, the method comprising, consisting essentially of, or consisting of, mixing at least one liquid additive solution comprising, consisting essentially of, or consisting of, at least one cuttings-reactive chemical with at least a portion of the oily drill cuttings slurry thereby creating a chemically-treated cuttings slurry wherein at least one cuttings-reactive chemical contacts and reacts with at least a portion of the drill cuttings; and destructively modifying at least a portion of the drill cuttings that are contacted by at least one cuttings-reactive chemical thereby disrupting attraction forces between the portion of the drill cuttings and the oily drill fluid.

Additionally there may be provided a method for separating oily drill fluid from an oily drill cuttings slurry comprising oily drill fluid and drill cuttings, the method comprising, consisting essentially of, or consisting of, mixing at least one liquid additive solution comprising, consisting essentially of, or consisting of, at least one cuttings-reactive chemical with at least a portion of the oily drill cuttings slurry thereby creating a chemically-treated cuttings slurry wherein at least one cuttings-reactive chemical contacts and reacts with at least a portion of the drill cuttings; and destructively modifying at least a portion of the drill cuttings that are contacted by at least one cuttings-reactive chemical thereby disrupting attraction forces between the portion of the drill cuttings and the oily drill fluid; and moving at least a portion of the chemically treated cuttings slurry into mechanical cuttings treatment equipment (MCTE) selected from the group consisting of a settling tank, a mixing tank, a heating tank, an oven, a conveyor, a sieve, a screen, a filter, a vibrator, a shaker, a shale shaker, a cuttings dryer, a centrifuge, a hydrocyclone and combinations thereof, wherein the MCTE separates at least a portion of the oily drill fluid from at least a portion of the chemically treated cuttings slurry; and removing at least a portion of the separated oily drill fluid from the MCTE.

Additionally, there may be provided a method for separating oily drill fluid from an oily drill cuttings slurry comprising the oily drill fluid and drill cuttings, the method comprising, consisting essentially of, or consisting of, placing the oily drill cuttings slurry into mechanical cuttings treatment equipment (MCTE) selected from the group consisting of: a settling tank, a mixing tank, a heating tank, an oven, a conveyor, a sieve, a screen, a filter, a vibrator, a shaker, a shale shaker, a cuttings dryer, a centrifuge, a hydrocyclone, and combinations thereof, and operating said MCTE to produce at least one mechanically treated cuttings slurry comprising, consisting essentially of, or consisting of, oily drill fluid and drill cuttings; and mixing at least one liquid additive solution comprising, consisting essentially of, or consisting of, at least one cuttings-reactive chemical with at least a portion of the at least one mechanically treated cuttings slurry thereby creating a chemically treated cuttings slurry wherein at least one cuttings-reactive chemical contacts and reacts with at least a portion of the drill cuttings; and destructively modifying at least a portion of the drill cuttings that are contacted by at least one cuttings-reactive chemical thereby disrupting attraction forces between the portion of the drill cuttings and the oily drill fluid; and moving at least a portion of the chemically treated cuttings slurry into MCTE wherein the MCTE separates at least a portion of the oily drill fluid from at least a portion of the chemically treated cuttings slurry; and removing at least a portion of the separated oily drill fluid from the MCTE.

Alternatively, there may be provided a method for separating oily drill fluid and barite from an oily drill cuttings slurry comprising, consisting essentially of, or consisting of, oily drill fluid and drill cuttings and barite, the method comprising, consisting essentially of, or consisting of, placing the oily drill cuttings slurry into mechanical cuttings treatment equipment (MCTE) selected from the group consisting of: a settling tank, a mixing tank, a heating tank, an oven, a conveyor, a sieve, a screen, a filter, a vibrator, a shaker, a shale shaker, a cuttings dryer, a centrifuge, a hydrocyclone, and combinations thereof, and operating said MCTE to produce at least one mechanically treated cuttings slurry comprising, consisting essentially of, or consisting of, oily drill fluid and drill cuttings and barite; and mixing at least one liquid additive solution comprising, consisting essentially of, or consisting of, at least one cuttings-reactive chemical with at least a portion of the at least one mechanically treated cuttings slurry thereby creating a chemically treated cuttings slurry wherein at least one cuttings-reactive chemical contacts and reacts with at least a portion of the drill cuttings; and destructively modifying at least a portion of the drill cuttings that are contacted by at least one cuttings-reactive chemical thereby disrupting attraction forces between the portion of the drill cuttings and the oily drill fluid and creating a barite-enhanced cuttings slurry in which the solids weight percent of barite has increased; and moving at least a portion of the barite-enhanced cuttings slurry into MCTE wherein the MCTE separates at least a portion of the oily drill fluid and barite from at least a portion of the barite-enhanced cuttings slurry; and removing at least a portion of the separated oily drill fluid and barite from the MCTE.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "about" in reference to a given parameter is inclusive of the stated value and has the meaning dictated by the context (e.g., it includes the degree of error associated with measurement of the given parameter).

The invention claimed is:

1. A method for separating oily drill fluid and barite from an oily drill cuttings slurry comprising oily drill fluid and drill cuttings and barite, the method comprising:
   mixing at least one liquid additive solution including at least one cuttings reactive chemical with at least a portion of the drill cuttings slurry thereby creating a chemically treated cuttings slurry wherein at least one cuttings-reactive chemical contacts and reacts with at least a portion of the drill cuttings;
   destructively modifying at least a portion of the drill cuttings that are contacted by the at least one cuttings-reactive chemical thereby disrupting attraction forces between the portion of the drill cuttings and the oily drill fluid and creating a barite-enhanced cuttings slurry in which the solids weight percent of barite has increased; and
   separating at least a portion of the oily drill fluid and barite from at least a portion of the barite-enhanced cuttings slurry.

2. The method as claimed in claim 1, wherein the at least one cuttings-reactive chemical is selected from the group consisting essentially of ammonium fluoride, ammonium bifluoride, barium fluoride, calcium fluoride, sodium fluoride, potassium fluoride, potassium bifluoride, fluoroboric acid, fluorosulfuric acid, antimony pentafluoride, hydrochloric acid, hydrofluoric acid, hexafluorosilicic acid, phosphoric acid, hydrobromic acid, phosphonic acid, sulfuric acid, nitric acid, citric acid, carboxylic acid, and combinations thereof.

3. A method for separating oily drill fluid and barite from an oily drill cuttings slurry that includes oily drill fluid, drill cuttings, and barite, the method comprising:
   placing the oily drill cuttings slurry into mechanical cuttings treatment equipment (MCTE) selected from the group consisting essentially of: a settling tank, a mixing tank, a heating tank, an oven, a conveyor, a sieve, a screen, a filter, a vibrator, a shaker, a shale shaker, a cuttings dryer, a centrifuge, a hydrocyclone, and combinations thereof, and operating said MCTE to produce at least one mechanically treated cuttings slurry comprising oily drill fluid and drill cuttings and barite;
   mixing at least one liquid additive solution including at least one cuttings-reactive chemical with at least a portion of the at least one mechanically treated cuttings slurry thereby creating a chemically treated cuttings slurry wherein at least one cuttings-reactive chemical contacts and reacts with at least a portion of the drill cuttings;
   destructively modifying at least a portion of the drill cuttings that are contacted by at least one cuttings-reactive chemical, thereby disrupting attraction forces between the portion of the drill cuttings and the oily drill fluid and creating a barite-enhanced cuttings slurry in which the solids weight percent of barite has increased;
   moving at least a portion of the barite-enhanced cuttings slurry into MCTE, wherein the MCTE separates at least a portion of the oily drill fluid and barite from at least a portion of the barite-enhanced cuttings slurry; and
   removing at least a portion of the separated oily drill fluid and barite from the MCTE.

4. The method as claimed in claim 3, wherein the at least one cuttings-reactive chemical is selected from the group consisting essentially of: ammonium fluoride, ammonium bifluoride, barium fluoride, calcium fluoride, sodium fluoride, potassium fluoride, potassium bifluoride, fluoroboric acid, fluorosulfuric acid, antimony pentafluoride, hydrochloric acid, hydrofluoric acid, hexafluorosilicic acid, phosphoric acid, hydrobromic acid, phosphonic acid, sulfuric acid, nitric acid, citric acid, carboxylic acid, and combinations thereof.

* * * * *